Figure 1:
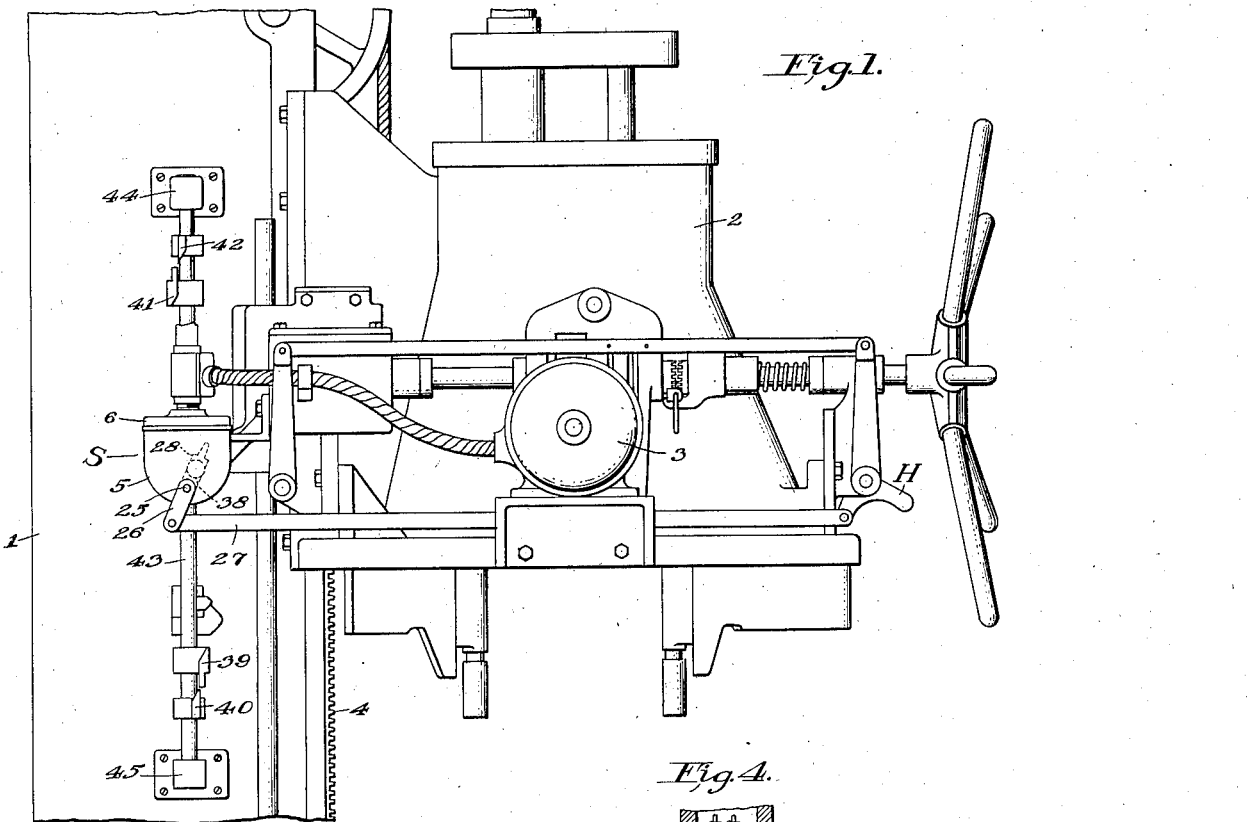

July 31, 1928.

R. M. GALLOWAY ET AL

SNAP SWITCH FOR MOTOR CONTROL

Original Filed Sept. 23, 1923   3 Sheets-Sheet 1

Inventors
Robert M. Galloway
Paul C. Burton
By Attorney
Albert F. Nathan

July 31, 1928.  1,678,725
R. M. GALLOWAY ET AL
SNAP SWITCH FOR MOTOR CONTROL
Original Filed Sept. 23, 1923   3 Sheets-Sheet 2
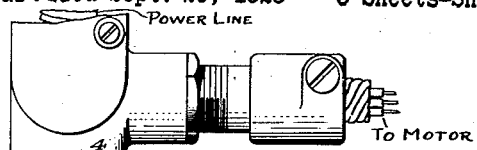
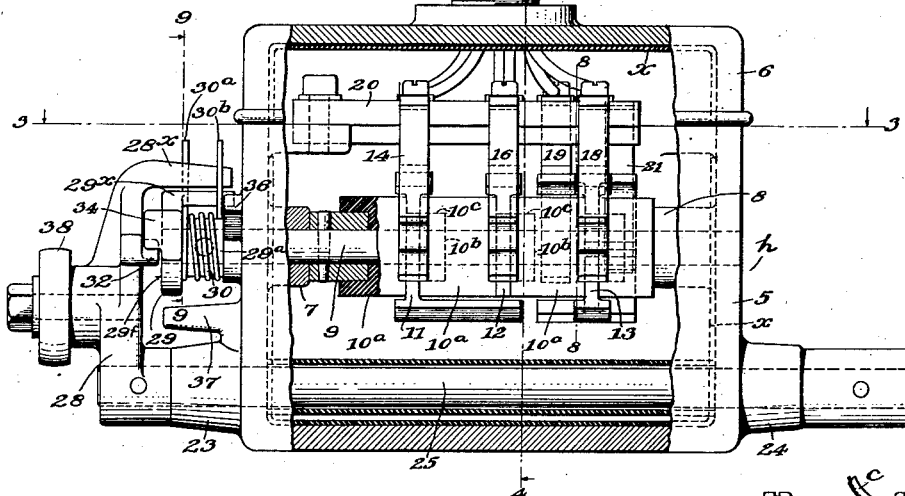
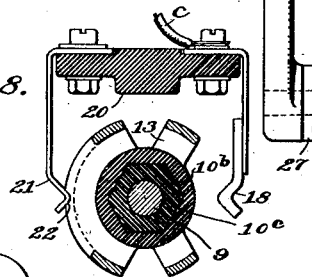
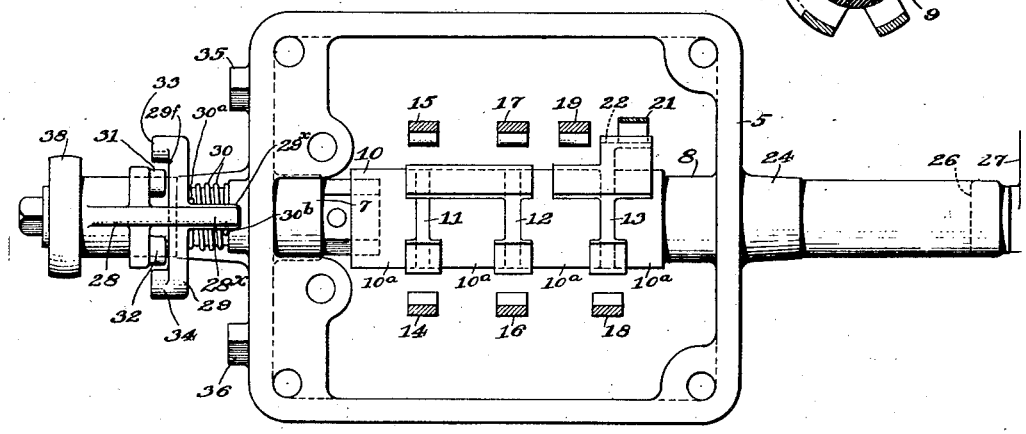
Inventors
Robert M. Galloway
Paul C. Burton
By Attorney
Albert F. Nathan

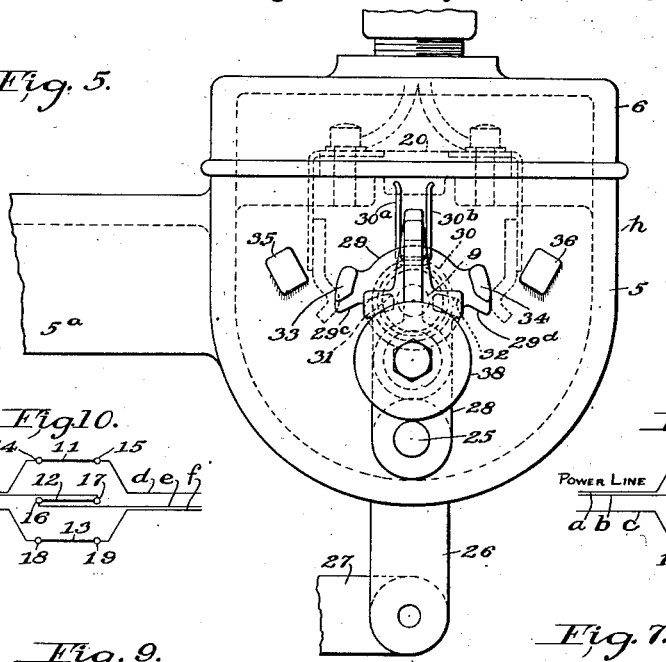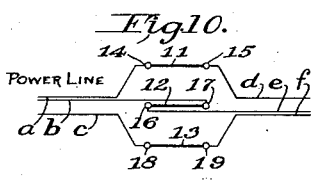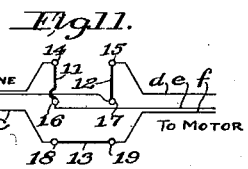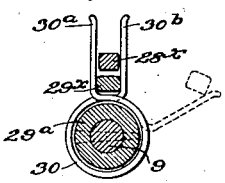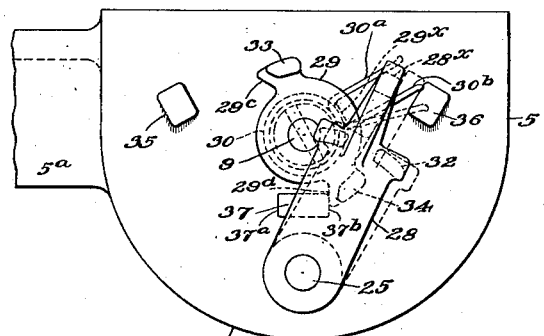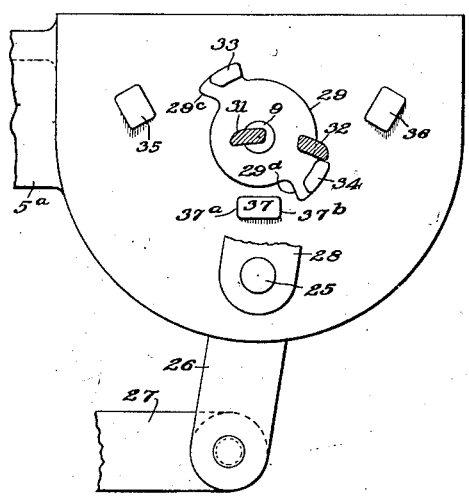

Patented July 31, 1928.

1,678,725

UNITED STATES PATENT OFFICE.

ROBERT M. GALLOWAY, OF RICHMOND, INDIANA, AND PAUL C. BURTON, OF CLARENDON HILLS, ILLINOIS, ASSIGNORS TO THE NATIONAL AUTOMATIC TOOL COMPANY, OF RICHMOND, INDIANA, A CORPORATION OF INDIANA.

SNAP SWITCH FOR MOTOR CONTROL.

Original application filed September 23, 1923, Serial No. 661,447. Divided and this application filed April 7, 1925. Serial No. 21,375.

In our pending application Serial No. 661,447, filed September 7, 1923 of which this application is a division, we have shown and described a drilling machine including a vertical standard, a drill-head translatably mounted on the standard, a slow power feed to force the tools into the work and a rapid traverse mechanism adapted to elevate and depress the drill-head to cause the tools rapidly to recede from and approach the work. This rapid traverse is actuated by a reversible motor operatively connected with a pinion, which engages a stationary rack affixed to the vertical standard. Thus rotation of the motor effects translation of the head on the standard, the direction of movement of the head being determined by the direction of rotation of the motor.

The flow of electric current to the motor to effect either forward or reverse rotation thereof is controlled by an electric switch carried by the drill-head. This switch is adapted to be actuated in timed relation with the movements of the drill-head by suitable trip dogs carried by the machine standard with which the switch actuating lever comes in contact during its vertical movements. Manual means also is provided to actuate the switch.

This invention relates more particularly to the switch for controlling the flow of current to the reversible motor and to the means to actuate the switch, and has for an object to provide a reversing switch which is simple and durable in construction, which comprises only a few parts and which will make and break the circuit instantaneously so that no sparking, or arcing, may occur between the connector and the electrical contacts which it connects.

Another object is to provide a switch in which an oscillatory connector has a neutral position and two active positions and to provide both manual and automatic means to actuate the switch, the automatic means being adapted to be rendered effective by vertical movement of the switch selectively to oscillate said connector to any one of its three positions in timed relation with the reciprocation of the drill-head.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 4:
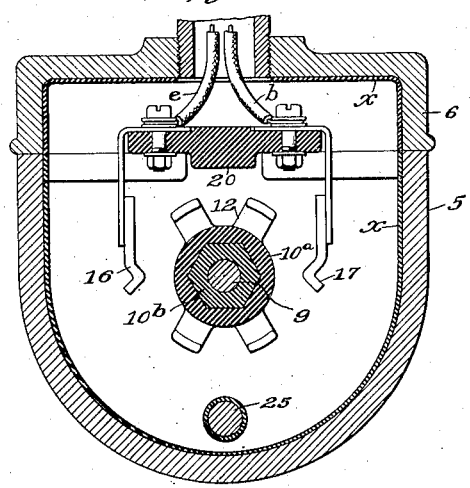

Fig. 1 is a side elevation of a portion of a drilling machine embodying the present invention. Fig. 2 is a side elevation, partly in section of the improved snap-switch. Fig. 3 is a section on the line 3—3 of Fig. 2, with the switch in its neutral position. Fig. 4 is a section on the line 4—4 of Fig. 2. Fig. 5 is a left end view of Fig. 2 with the parts in their neutral positions. Fig. 6 is a view similar to Fig. 5 but showing the switch actuating parts in a position just ready to effect an instantaneous breaking of the contacts. Fig. 6ª is a detail view showing the position of certain locking lugs, later to be described, just prior to the making of an electrical contact. Fig. 6ᵇ is a similar view just prior to the breaking of the contact. Fig. 7 is a view similar to Fig. 6 but showing the parts in one of their extreme positions. Fig. 8 is a detail section on the line 8—8 of Fig. 2. Fig. 9 is a detail section on the line 9—9 of Fig. 2. Figs. 10 and 11 are diagrammatic views illustrating the changes in the connections between the power line and the motor which effect the reversal of the motor.

Referring more particularly to the drawings, the invention is disclosed as used in connection with a drilling machine comprising a standard 1 upon which is translatably mounted the usual drill-head 2. As more fully set forth in our above noted application, Serial No. 661,447, this head is adapted to be moved vertically on the column by either of two feeding mechanisms. One of these mechanisms commonly known as the rapid traverse is adapted to move the drill-head rapidly to bring the tools to the work and rapidly to elevate the head after the drilling or other operation. The other feeding mechanism, the slow power feed, is utilized to slowly feed the tools into the work while they are rotated by any suitable means. The rapid traverse mechanism includes a reversible motor 3 carried by the drill-head and operatively connected with a pinion (not shown) permanently in mesh with a rack 4 carried by the standard 1. As will readily be perceived, rotation of the motor in one direction causes the drill-head rapidly to be depressed and rotation of the motor in the opposite direction causes the head rapidly to be elevated. The motor is preferably of the three-phase type and its direction of rotation may be reversed by changing two of the three power lines leading thereto, as is usual with this type of motor. This change may be effected by means of a switch S carried by and vertically movable with, the drill-head 2. The switch is adapted to be actuated either manually or automatically as later will be described.

The switch preferably comprises a housing $h$ consisting of a lower body portion 5 and a detachable cover 6, both of which are lined with a suitable insulating material $x$. An arm $5^a$ integral with the portion 5 serves to support the housing from the drill-head 2. Within the body portion 5 of the housing is journaled in bearings 7 and 8, a shaft 9 upon which is fixed a drum 10 of insulating material. This drum is preferably built up of a plurality of sections $10^a$ each having a reduced hexagonal end $10^b$ which fits into a similarly shaped socket $10^c$ in an adjacent section. Secured upon the reduced ends of the sections $10^a$ are contact segments 11, 12 and 13 adapted selectively to electrically connect in pairs contact fingers 14, 15, 16, 17, 18 and 19 carried by a block 20 of insulating material secured in the upper portion of the housing $h$. As shown in Figs. 10 and 11 the fingers 14, 17 and 18 may have connected to them wires $a$, $b$, and $c$ constituting a suitable power line and the fingers 15, 16 and 19 may be connected to the reversible motor 3 by wires $d$, $e$ and $f$.

The shaft 9 and the contact segments carried thereby are adapted to occupy any one of three angular positions of which one is neutral, one produces forward rotation of the motor and the other produces reverse rotation thereof. In one effective position of the parts as shown in Fig. 10 the wires $a$, $b$ and $c$ are connected respectively with the wires $d$, $e$ and $f$ as shown in heavy lines in Fig. 10, thus rotating the motor in a predetermined direction. In the other effective position of the parts as shown in Fig. 11, the wire $a$ is connected with the wire $e$ and the wire $b$ is connected with wire $d$, the connection between the wires $c$ and $f$ being unchanged, thus the direction of rotation of the motor is reversed as is well understood by those skilled in the art. The block 20 also carries a spring detent finger 21 adapted to engage a detent notch 22 formed in the contact segment 13 yielding to hold the parts centrally in their neutral position.

Journaled within the housing section 5, parallel with the shaft 9 and in bearings 23 and 24 is a switch actuating shaft 25 to one end of which is secured a crank 26 forming a part of a manual actuating means for the switch. A link 27 pivotally connected at one end to the crank 26 has its opposite end connected to one arm of a bell-crank lever H, fulcrumed on the drill-head within easy reach of the operator, whereby he may conveniently oscillate the shaft 25 and thereby, through an operative connection between that shaft and the shaft 9, actuate the switch.

As hereinbefore stated it is an object of this invention to provide means to actuate the switch instantaneously to prevent an arc between the contact fingers and the contact segments. The present invention provides a very simple and effective means for accomplishing this result. This means consists of a load-and-fire mechanism between the shaft 25 and the shaft 9 and consists of only three parts viz. an actuating lever or arm 28 fixed to the shaft 25, a rocker 29 fixed to the shaft 9 and a coil spring 30 wound about the hub $29^a$ of the rocker and having spaced outwardly projecting ends $30^a$ and $30^b$. The lever 28 and the rocker 29 are of such form and proportions that they readily may be cast and require very little machining to render them ready for use. The lever 28 is formed, on its side adjacent the rocker, with two locking lugs 31 and 32 so arranged with respect to the axis of the shaft 25 that upon oscillation of the lever 28 the lugs are moved over the face $29^f$ of the rocker and intersect the axis of the shaft 9. The rocker 29 is likewise provided on its face adjacent the lever 28, with locking lugs 33 and 34 arranged in the plane of the lugs 31 and 32 and adapted upon oscillation of the rocker to intersect the path of, and to come into contact with, the lugs 31 and 32. The lever 28 and the rocker 29 are provided with laterally extending arms $28^x$ and $29^x$ respectively arranged in substantial parallelism and extending between the spaced arms $30^a$ and $30^b$ of the spring 30. Stop lugs 35 and 36 integral with the housing 5 are adapted to engage the opposite faces of the arm $28^x$ thereby to limit its movements in opposite directions. Another stop-lug 37 provided by the housing, has its opposite sides $37^a$ and $37^b$ arranged in the path of the heels $29^c$ and $29^d$ on the rocker 29 to limit the extent of oscillation of the rocker.

In addition to the manual means for operating the switch there is also provided automatic means adapted to actuate the switch in timed relation with the reciprocation of the drill-head on the standard. To this end the switch actuating lever 28 carries, intermediate its ends, a roller 38. During the vertical movements of the switch with the drill-head this roller is successively brought into contact with trip-dogs, or cams 39, 40, 41 and 42, adjustably secured upon a rod 43 carried by brackets 44 and 45 secured to the standard 1.

Assuming that the motor 3 is rotating forwardly and the drill-head is being lowered by the rapid traverse, the arms 26 and 28 will be in the positions shown in full and dotted lines respectively in Fig. 1 and the action of the cams 39, 40, 41 and 42 is as follows. Just prior to contact of the tools with the work the roller 38 engages the cam 39 which causes the lever 28 to be swung to its central position thereby breaking contact between the contact segments and the contact fingers and bringing the rapid traverse to rest. The slow power feed then continues the downward movement of the drill-head but at a much slower speed. When the tools have penetrated the work to the desired depth the slow power feed is discontinued as the roller 38 engages the cam 40 which again shifts the lever 28 and throws the switch to a position in which current flows to the motor 3 to reverse its direction of rotation whereupon the rapid traverse mechanism rapidly elevates the drill-head until the roller 38 is brought into contact with the cam 41 adjacent the upper end of the rod 43. This cam again shifts the parts to their neutral position and discontinues the rapid upward movement of the drill-head. The momentum of the drill-head and other moving parts will however, cause a limited upward movement of the drill-head after the roller and switch actuating lever have been brought to their neutral position, with the result that the roller engages the cam 42. This cam shifts the lever 28 and, through the rocker 29 and shaft 9, the contact segments are oscillated to a position wherein they make the necessary contact with the contact fingers to again effect forward rotation of the motor which results in a rapid down feed of the drill-head.

As hereinbefore described the connection between the shafts 25 and 9 is in the nature of a load-and-fire mechanism which effects instantaneous make and break between the contact segments and the contact fingers. The operation of this device is as follows:—

Assuming that the parts are in the position shown in Fig. 7 which causes the power feed wires $a$, $b$ and $c$ to be connected to the wires $d$, $e$ and $f$ as shown in Fig. 11 and that the drill-head is being elevated by the rapid traverse contact of the roller 38 with the cam 41 shifts the lever counter-clockwise, as viewed in Fig. 7. The initial movement of the lever 28 moves the locking lug 32 in the arc $x$ (Fig. 6$^a$) which intersects the arc $y$ in which the lug 34 moves. This causes the lug 32 to override the lug 34 and temporarily prevents its movement in the arc $y$.

Referring now particularly to Figs. 6, 6$^a$ and 6$^b$, it will be seen that in moving to the position shown in Fig. 6 from the position shown in Fig. 7, the arm 28$^x$ has moved with it the projecting end 30$^a$ of the spring 30 and inasmuch as the end 30$^b$ is held against similar movement by the arm 29$^x$ of the rocker 29 the ends 30$^a$ and 30$^b$ are separated thereby winding the spring and storing power therein. Upon further movement of the lever 28 the point 32$^x$ of the lug 32 releases the point 34$^x$ of the lug 34 whereupon the power stored in the spring instantaneously rotates the rocker 29 the shaft 9 and the segments 11, 12 and 13 to throw the switch into its neutral position The separation of the contacts is effected with sufficient rapidity to prevent arcing, or sparking, between the contact fingers and the contact segments.

In throwing the segments into contact with the contact fingers the operation of the actuating lever 28, rocker 29 and the spring is substantially the same as above described except that the lug 32 passes beneath the lug 34 and prevents rotation of the rocker under the action of the spring until the point 32$^y$ of the lug 32 releases the point 34$^y$ of the lug 34. The stop lug 36 is so located with respect to the arm 28$^x$ as to insure the separation of the lugs 32 and 34 before the arm contacts with the lug. Upon release of the manual shifting means or upon separation of the roller 38 from its actuating cams the power remaining in the spring retracts the arm 28 from the stop lug as shown in full lines in Fig. 7.

The operation of the parts in shifting the switch to stop the rapid down feed and to start the rapid up feed is similar to the operation above described except that the lugs 31 and 33 effect the locking of the rocker and its subsequent release to permit the spring to shift the parts.

From the foregoing it will be perceived that this invention provides a three-position switch of simple construction which effects quick make and break of the electrical circuit whereby the objectionable sparking between the contacts is precluded. Also that the invention provides both manual and automatic means to operate the switch, the automatic means being adapted to operate in timed relation with the reciprocation of the drill head.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of the United States:—

1. An electric switch comprising a housing; a plurality of fixed contacts in said housing; a first oscillatory shaft journaled in said housing; a contact member carried by said shaft and adapted upon oscillation of the shaft selectively to connect said contacts; a second oscillatory shaft journaled in said housing parallel with said first shaft; manual means to oscillate said second shaft including an actuating crank secured to one end of said shaft; a lever secured upon the opposite end of said shaft; a rocker secured to said first shaft adjacent said lever; an operative connection between said lever and said rocker to transmit oscillatory movement from the second shaft to said first shaft; and a roller carried by said lever and adapted to be acted upon by power means to shift said lever thereby to oscillate said first shaft and the contact member carried thereby.

2. An electric switch comprising a housing; a plurality of fixed contacts in said housing; a first shaft journaled in said housing; a plurality of connecting elements carried by said shaft and adapted selectively to electrically connect said contacts; a second shaft journaled in said housing at one side of said first shaft; a rocker secured to said first shaft and provided with two stop lugs and a spring-retaining arm; a coil spring surrounding said first shaft and having outwardly extending ends at opposite sides of said spring retaining arm; a lever fixed to said second shaft and provided with stop lugs and a laterally projecting spring tensioning arm extending between the ends of said spring; means to move said lever first, to bring one of its lugs into contact with one of the lugs on said rocker to hold said rocker against rotation, second, to store power in said spring and finally to disengage said stop lugs to permit said spring to turn said rocker and thereby turn said first shaft and the connecting elements carried thereby.

3. A snap switch comprising a support; a plurality of fixed contacts carried by said support; a shaft journaled in said support; an electrical connector carried by said shaft and adapted to electrically connect said contacts; a rocker secured upon one end of the shaft and provided with an outwardly projecting lug and an inwardly projecting arm; a lever fulcrumed on said support at one side of and parallel to the axis of said shaft; a lug carried by said lever and movable therewith across the face of said rocker in an arc intersecting the path of movement of the lug on said rocker; an arm projecting laterally from said lever and lying adjacent the arm on said rocker; a coil spring surrounding said shaft and having outwardly extending ends at opposite sides of said arms; and means to oscillate said lever with said lugs in contact, first to wind said spring and next to separate said lugs to permit said spring to rotate said shaft, instantaneously to separate said connector from said contacts.

4. A switch comprising a housing, a plurality of contacts in said housing; an oscillatory member journaled in said housing; a plurality of connectors carried by said member and adapted in different angular positions of said member to connect different pairs of said contacts; an actuating lever fulcrumed upon said housing at one side of said oscillatory member; two spaced stop lugs formed on said lever; a rocker secured upon said oscillatory member; two lugs on the face of said rocker adjacent said lever and in the vertical plane of said stop lugs, the lugs on said lever and on said rocker being so arranged that upon oscillation they move in intersecting arcuate paths; a spring connection between said lever and said rocker; means to oscillate said lever and through said lever and spring connection to oscillate said rocker to bring two of said lugs into contact, said lugs acting temporarily to hold said rocker against rotary movement while a continued movement of the lever stores power in said spring; and means to separate said lugs to permit said spring to turn said oscillatory member.

5. A three position electric switch having reversing and neutral positions comprising a series of electrical contacts; a member carrying a plurality of connecting elements adapted selectively to connect in pairs said contacts; an actuating shaft; an arm carried by said shaft; a rocker on said member; a spring interposed between said arm and said rocker to transmit to the latter power from the former; and co-acting lugs carried by said arm and rocker and adapted to be brought together by movement of the arm to hold said rocker against movement until said arm has reached a predetermined position.

In witness whereof, we have hereunto subscribed our names.

ROBERT M. GALLOWAY.
PAUL C. BURTON.